United States Patent
Endress et al.

(10) Patent No.: US 11,283,610 B2
(45) Date of Patent: Mar. 22, 2022

(54) METHODS AND SYSTEMS FOR TOKEN-BASED ANCHORING OF A PHYSICAL OBJECT IN A DISTRIBUTED LEDGER ENVIRONMENT

(71) Applicant: Merck Patent GmbH, Darmstadt (DE)

(72) Inventors: Thomas Endress, Munich (DE); Daniel Szabo, Darmstadt (DE); Frederic Berkermann, Darmstadt (DE); Natali Melgarejo Diaz, Darmstadt (DE); Carl Christian Brazel, Darmstadt (DE); Michael Platzoeder, Munich (DE)

(73) Assignee: MERCK PATENT GMBH, Darmstadt (DE)

( * ) Notice: Subject to any disclaimer, the term of this patent is extended or adjusted under 35 U.S.C. 154(b) by 243 days.

(21) Appl. No.: 16/440,148

(22) Filed: Jun. 13, 2019

(65) Prior Publication Data
US 2020/0259653 A1 Aug. 13, 2020

(30) Foreign Application Priority Data
Feb. 13, 2019 (EP) .................................. 19157030

(51) Int. Cl.
*H04L 9/32* (2006.01)
*H04L 9/06* (2006.01)

(52) U.S. Cl.
CPC .......... *H04L 9/3213* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 9,893,898 B2 * | 2/2018 | Kreft | ...................... | G06Q 20/223 |
| 2002/0198849 A1 * | 12/2002 | Piikivi | ............... | G06Q 20/3227 705/76 |
| 2012/0084850 A1 * | 4/2012 | Novak | .................. | G06F 21/575 726/8 |
| 2013/0230166 A1 * | 9/2013 | Bauchot | ................ | H04L 9/3247 380/44 |

(Continued)

OTHER PUBLICATIONS

International Search Report and Written Opinion issued in PCT/EP2020/053374 dated May 8, 2020, 15 pages.

(Continued)

*Primary Examiner* — Benjamin E Lanier
(74) *Attorney, Agent, or Firm* — Faegre Drinker Biddle & Reath LLP

(57) ABSTRACT

The invention relates to a computer-implemented method, system and computer program for tokenization of a physical object. The method comprises generating or receiving object identification data based on an inspection of the physical object, the object identification data comprising at least one cryptographic hash value as a collision-resistant virtual representation of the physical object; and generating a non-certified token being assigned to the physical object and representing the object identification data. The invention further relates to a computer-implemented method, system and computer program of certifying a token including object identification data. Moreover, the invention relates to a computer-implemented method, system and computer program of tokenization of a process.

20 Claims, 11 Drawing Sheets

(56) References Cited

U.S. PATENT DOCUMENTS

| | | | | |
|---|---|---|---|---|
| 2015/0278487 A1* | 10/2015 | Scott | ................... | H04L 9/3239 |
| | | | | 726/28 |
| 2018/0174158 A1 | 6/2018 | Endress | | |
| 2018/0204191 A1* | 7/2018 | Wilson | ................. | H04L 9/3242 |
| 2018/0375840 A1 | 12/2018 | Moy et al. | | |
| 2019/0034923 A1* | 1/2019 | Greco | ................. | G06Q 20/389 |
| 2020/0162262 A1* | 5/2020 | Shekh-Yusef | ......... | H04L 9/3236 |

OTHER PUBLICATIONS

Islam MD, Nazmul, et al., "On IC traceability via blockchain," 2018 International Symposium on VLSI Design, Automationa dn Test (VLSI-DAT), IEEE, Apr. 16, 2018, 4 pages.
Haenni, "Datum Network. The decentralized data marketplace," Datum White Paper V15, Jun. 24, 2017, pp. 1-36.
Scheuer, "Health Information Traceability Foundation," White Paper, HIT Foundation, version 2.03, Jan. 10, 2019, pp. 1-22.
Extended European Search Report issued in EP19175609.7 dated Jun. 30, 2020, 10 pages.

\* cited by examiner

| Asset Token |
|---|
| (Object, asset) ID & type of Token |
| Framework Identifier |
| Object secret (e.g. colission resistant hash) |
| Owner (e.g. public key) |
| Certificate(s) incl. signature |
| Encrypted (asset) data (amount, owner, object, process,...) |

(a)

| Utility Token |
|---|
| (action, transaction) ID + type of Token |
| Framework Identifier |
| Process (Object, process etc.) secret (e.g. colission resistant hash) |
| Owner (e.g. public key) |
| Certificate(s) incl. signature |
| Encrypted (asset) data (amount, owner, object, process,...) |
| Resources (effected) |
| Action (represented) |

METHODS AND SYSTEMS FOR TOKEN-BASED ANCHORING OF A PHYSICAL OBJECT IN A DISTRIBUTED LEDGER ENVIRONMENT

CROSS-REFERENCE TO RELATED APPLICATIONS

This application claims priority to European (EP) patent application No. 19157030.8, filed Feb. 13, 2019, which is incorporated herein by reference in its entirety.

FIELD OF THE INVENTION

The present invention relates to the field of tracing, anti-counterfeit protection and enabling a decentralized marketplace of physical objects, such as products, like for example pharmaceutical products or other health-related products or spare parts or any other widget, and particularly to anchoring such physical objects by way of tokenization into one or more distributed ledger environments. Specifically, the invention is directed to a computer-implemented method, system and computer program for tokenization of a physical object. The invention further relates to a computer-implemented method, system and computer program of certifying a token including object identification data. Moreover, the invention relates to a computer-implemented method, system and computer program of tokenization of process. Finally, the invention relates to a token comprising object identification data.

BACKGROUND

In many industries, counterfeiting of products is a substantial problem that significantly impacts not only the revenues of original product manufacturers, but may even pose a serious threat to health and even life of consumers or operators of counterfeited, i.e. fake products. Such safety relevant product categories include in particular parts for automobiles and aircraft, components for the construction of buildings or other infrastructure, food, and even medical devices and pharmaceuticals.

Furthermore, in a broad range of different industries traceability of goods and physical objects is a key requirement. This applies in particular to logistics and supply chain infrastructures and to highly regulated/structured work flow environments. Examples are industry work places being controlled by official regulators such as the FDA (US Food & Drug Administration), and/or being certified e.g. according to GMP (Good manufacturing practice), GLP (Good laboratory practice), GCP (Good clinical practice), or DIN ISO or similar other standards and rules. Each of these regulated environments requires in particular an audit trail and auditable technologies. A further example is the traceability of high value products such as industrial spare parts in order to proof authenticity and intended use of these parts in secondary markets.

In order to limit counterfeiting and provide supply chain and work flow integrity, including recognition and authentication of products within work flows and supply chains, various industries have developed a number of different protection measures and identification solutions. Broadly used protection measures comprise adding a so-called security feature to a product, the feature being rather difficult to fake. For example, holograms, optically variable inks, security threads and embedded magnetic particles are known security features which are difficult to reproduce by counterfeiters. While some of these security features are "overt", i.e. can be easily seen or otherwise recognized by a user of the product, other security features are "covert", i.e. they are hidden and can only be detected by using specific devices, such as sources of UV-light, spectrometers, microscopes or magnetic field detectors, or even more sophisticated forensic equipment. Examples of covert security features are in particular printings with luminescent ink or ink that is only visible in the infrared part of the electromagnetic spectrum but not in its visible part, specific material compositions and magnetic pigments.

A specific group of security features, which are in particular used in cryptography, is known as "Physical Unclonable Functions" (PUFs). PUFs are sometimes also referred to as "Physically Unclonable Functions" or "Physical Random Functions". A PUF is a physical entity that is embodied in a physical structure and is easy to evaluate but hard to predict, even for an attacker with physical access to the PUF. PUFs depend on the uniqueness of their physical microstructure, which typically includes a random component that is already intrinsically present in the physical entity or is explicitly introduced into or generated in the physical entity during its manufacturing and which is substantially uncontrollable and unpredictable. Accordingly, even PUFs being produced by the exact same manufacturing process differ at least in their random component and thus can be distinguished. While in most cases, PUFs are covert features, this is not a limitation and overt PUFs are also possible. PUFs are furthermore ideal for enabling passive (i.e. without active broadcasting) identification of physical objects.

PUFs are known in particular in connection with their implementation in integrated electronic circuits by way of minimal unavoidable variations of the produced microstructures on a chip within given process-related tolerances, and specifically as being used for deriving cryptographic keys therefrom, e.g. in chips for smartcards or other security related chips. An example of an explanation and application of such chip-related PUFs is disclosed in the article "*Background on Physical Unclonable Functions (PUFs)*", Virginia Tech, Department of Electrical and Computer Engineering, 2011, which is available in the Internet at the hyperlink: http://rijndael.ece.vt.edu/puf/background.html.

However, also other types of PUFs are known, such as random distributions of fibers in paper used as a substrate for making banknotes, wherein the distribution and orientation of fibers can be detected by specific detectors and used as a security feature of the bank-note. In order to evaluate a PUF, a so-called challenge-response authentication scheme is used. The "challenge" is a physical stimulus applied to the PUF and the "response" is its reaction to the stimulus. The response is dependent on the uncontrollable and unpredictable nature of the physical microstructure and thus can be used to authenticate the PUF, and thus also a physical object of which the PUF forms a part. A specific challenge and its corresponding response together form a so-called "challenge-response pair" (CRP).

Anti-counterfeit protection systems and methods based on using PUFs to authenticate products is described in each of the following European Patent Applications: EP 3 340 213 A1, EP 3 340 212 A1, EP 18170044.4, and EP 18170047.7, each of which is incorporated herein in its entirety by way of reference. Methods and systems for automatic object recognition and related anti-counterfeit protection systems and methods are disclosed in the European Patent Application EP 18214512.8, which is also incorporated herein in its entirety by way of reference.

Asymmetric cryptography sometimes also referred to as "public key cryptography" or "public/private key cryptography" is a known technology based on a cryptographic system that uses pairs of keys, wherein each pair of keys comprises a public key and a private key. The public keys may be disseminated widely and are usually even publicly available, while the private keys are kept secret and are usually only known to their owner or holder. Asymmetric cryptography enables both (i) authentication, which is when the public key is used to verify that a holder of the paired private key originated a particular information, e.g. a message or stored data containing the information, by digitally signing it with his private key, and (ii) protection of information, e.g. a message or stored data, by way of encryption, whereby only the owner/holder of the paired private key can decrypt the message encrypted with the public key by someone else.

Recently, blockchain technology has been developed, wherein a blockchain is a distributed ledger in the form of a distributed database containing a plurality of data blocks and which maintains a continuously-growing list of data records and is hardened against tampering and revision by cryptographic means. A prominent application of blockchain technology is the virtual Bitcoin currency used for monetary transactions in the Internet. A further known blockchain platform is provided for example by the Ethereum project. In essence, a blockchain can be described as a decentralized protocol for logging transactions between parties, which transparently captures and stores any modifications to its distributed database and saves them "forever", i.e. as long as the blockchain exists. Storing information into a blockchain involves digitally signing the information to be stored in a block of the blockchain. Furthermore, maintaining the blockchain involves a process called "blockchain mining", wherein so-called "miners" being part of the blockchain infrastructure, verify and seal each block, such that the information contained therein is saved "forever" and the block can no longer be modified.

A further new distributed ledger technology is known by the name of the "Tangle", which is blockless and permissionless distributed ledger architecture, which is scalable, light-weight, and provides a consensus in a decentralized peer-to-peer system. A prominent related technology using the Tangle as a technical basis is known as "IOTA", which is a transactional settlement and data integrity layer for the Internet of Things.

Particularly in connection with blockchain technology, tokenization of critical data, i.e. the process of substituting a sensitive data element with the non-sensitive equivalent, referred to as a "token", that has no extrinsic or exploitable meaning or value, has been introduced, in particular for applications in the finance industry and in connection with so-called smart contracts. A "smart contract" is a computer protocol intended to digitally facilitate, verify, or enforce the negotiation or performance of a contract. Smart contracts allow the performance of credible transactions without third parties. These transactions are trackable and irreversible. One exemplary public digital platform that is based on tokenization and smart contracts is known as the Etherium platform (https://www.ethereum.org) which allows, in particular, to create digital currency based on the platform.

A technical token standard used by this platform is known as the "ERC 20" token standard
(cf. https://theethereum.wiki/w/index.php/Ethereum Based Tokens;
https://theethereum.wiki/w/index.php/ERC20 Token Standard).

The concepts of tokens and smart contracts are however not limited to the Etherium platform and are rather more general concepts that may also be used for other platforms or applications.

SUMMARY OF THE INVENTION

It is an object of the present invention to provide a solution for a token-based anchoring of a physical object, such as a product, in a distributed ledger environment.

A solution to this problem is provided by the teaching of the appended independent claims, which define interacting components of an overall token-based ecosystem. Various preferred embodiments of the present invention are provided by the teachings of the dependent claims.

A first aspect of the invention is directed to a computer-implemented method of tokenization of a physical object, such as a product, the method comprising: (i) generating or receiving object identification data based on an inspection of the physical object, the object identification data comprising at least one cryptographic hash value as a collision-resistant virtual representation of the physical object; (ii) generating a non-certified token being assigned to the physical object and representing the object identification data.

This method provides for a tamper-resistant anchoring of a physical object, such as a product, in a token-based eco-system distributed ledger environment and thus allows for establishing a link of real-world tangible, i.e. physical objects, to a virtual token-based ecosystem which in turn may enable decentralized marketplaces for such physical objects of all kinds.

According to some embodiments, the method further comprises: (i) communicating a non-certified token validation request data via a token framework to one or more certification systems, the non-certified token validation request data representing information indicating the creation of the non-certified token in relation to the object identification data and a request to have the non-certified token validated; (ii) receiving token certification data representing a certification of the previously non-certified token by at least one of the certification systems; and (ii) storing the certification data into: (ii-1) the non-certified token to convert the non-certified token into a certified token being certified by and with respect to each of the certifications represented by the token certification data, or (ii-2) a different token being derived from the non-certified token and thereby certifying the different token with respect to each of the certifications represented by the token certification data; and (iii) storing the certified token and/or metadata related to the object identification data in a protected data repository, preferably in a digital wallet.

The term "token framework", as used herein refers to a specified layer in the communication technology used for communication between different components of the overall token-based eco-system. This layer is defined according to a, preferably standardized, technical specification which all components of the eco-system use to exchange information in the form of tokens among each other.

According to some embodiments, the method further comprises: (i) generating or receiving inspection certification data representing a respective certification of (i-1) one or more object inspection systems used for generating the object identification data, and/or of (i-1) one or more inspection participants, each inspection participant being a device, person or to institution related to one or more of the object inspection systems or their operation; and (ii) including the inspection certification data in the non-certified token validation request data before communicating it to the o the at least one certification system.

According to some related embodiments, the inspection certification data is generated or received, respectively, repeatedly according to a defined repetition scheme. Specifically, the repetition scheme may define that a repetition occurs periodically, each time a tokenization is performed or a device performing it is used, or after a specified number of inspections has occurred since the inspection certification data was last generated or received.

According to some related embodiments, the method further comprises: (i) creating, within the token framework, a utility token based on the non-certified token, the utility token comprising data representing a resource and an action the resource is thereby requested to perform; and (ii) wherein communicating the non-certified token validation request data comprises incorporating the request to have the non-certified token validated at least in part in the utility token and communicating the utility token to the certification system.

According to some related embodiments, the method further comprises storing the non-certified token validation request data, at least in parts, or causing it to be stored into one or more distributed ledgers.

According to some related embodiments, the method further comprises storing the non-certified token and/or the certified in a protected data repository, preferably in a digital wallet.

According to some related embodiments, the method further comprises (i) communicating information request data via the token framework to one or more of the certification systems, the information request data representing an identity of a requestor and a certified request of the requestor to receive specified requested data; and (ii) receiving in return the requested data via the token framework, if the request is certified by the respective certification system.

According to some related embodiments, the method further comprises storing the received requested data, at least in parts, into one or more distributed ledgers.

According to some related embodiments, the method further comprises identifying, by to means of the token framework, one or more data sources from which the requested data may be retained and communicating the information request data selectively to these one or more data sources.

According to some related embodiments, the method further comprises: (i) receiving information request data via the token framework, the information request data representing an identity of a requestor and a certified request of the requestor to receive specified requested data; and (ii) communicating in return the requested data via the token framework.

According to some embodiments, at least one of the object identification data, the inspection certification data, the non-certified token validation request data, the token certification data, the information request data, and the requested data is communicated, received or stored, respectively, in the form of data being embodied in a token.

A second aspect of the invention is directed to a system for tokenization of a physical object, such as a product, the system being configured to perform the method of the first aspect. The system may particularly comprise a reader device for sensor-based capturing of the object identification data.

A third aspect of the invention is directed to a computer program for tokenization of a physical object, such as a product, the computer program comprising instructions which when executed on a processing platform of system of claim 13 cause the system to perform the method of the first aspect.

A fourth aspect of the invention is directed to a computer-implemented method of certifying a token including object identification data, the method comprising: (i) receiving or generating and storing reference object identification data relating to a specific physical reference object and comprising at least one cryptographic hash value as a collision-resistant virtual representation of the physical reference object; (ii) receiving, from a requesting system via a token framework, non-certified token validation request data representing (ii-1) object identification data relating to a specific physical object and comprising at least one cryptographic hash value as a collision-resistant virtual representation of the physical object, and (ii-2) information indicating the creation of a non-certified token in to relation to the object identification data and a request to have the non-certified token validated; (iii) correlating, e.g. comparing, the object identification data with the reference object identification data with respect to a specified matching criterion; and (iv) if the according to the matching criterion the object identification data matches the reference object identification data, communicating via a token framework token certification data representing a certification of the previously non-certified token to the requesting system (Otherwise the communication of the certification data is omitted).

A fifth aspect of the invention is directed to a certification system being configured to perform the method of the fourth aspect.

A sixth aspect of the invention is directed to a computer program for certifying a token, the computer program comprising instructions which when executed on a processing platform of the certification system of the fifth aspect to cause the certification system to perform the method of the fourth aspect.

A seventh aspect of the invention is directed to a computer-implemented method of tokenization of a process, such as an identification process for identifying a physical object, the method comprising: (i) generating or receiving process result data representing a result of an interaction of two or more identified certified physical objects in the course of a specific standardized or certified process, the certified physical objects being certified according to the method of the fourth aspect; (ii) generating a utility token being assigned to and including the process result data.

According to some embodiments, the utility token is initially generated as a non-certified utility token; and the method further comprises: (i) communicating a non-certified utility token validation request data via a token framework to one or more certification systems, the non-certified utility token validation request data representing information indicating the creation of the non-certified utility token in relation to the process result data and a request to have the non-certified token validated; (ii) receiving token certification data representing a certification of the previously non-certified utility token by at least one of the certification systems; and (iii) storing the certification data into: (iii-1) the non-certified utility token to convert the non-certified utility token into a certified utility token being certified by and with respect to each of the certifications represented by the token certification data, or (iii-2) a different utility token being derived from the non-certified utility token and thereby certifying the different utility token with respect to each of the certifications represented by the token certification data; and (iv) storing the certified utility token and/or metadata related to the certified process in a protected data repository, preferably in a digital wallet.

According to some embodiments the method further comprises: (i) generating or receiving process participant certification data representing a respective certification of one or more process participants, each process participant being a device, person or institution involved in the performance of the standardized process; and (ii) including the process certification data in the non-certified utility token validation request data before communicating it to the at least one certification system.

According to some embodiments the process participant certification data is generated or received, respectively, repeatedly according to a defined repetition scheme. Specifically, the repetition scheme may define that a repetition occurs periodically, each time a tokenization of the process results is performed or a device performing it is used, or after a specified number of process runs has occurred since the participant certification data was last generated or received.

According to some embodiments the method further comprises storing the non-certified utility token validation request data, at least in parts, or causing it to be stored into one or more distributed ledgers.

According to some embodiments the method further comprises storing the non-certified utility token in a protected data repository, preferably in a digital wallet.

According to some embodiments the method further comprises: (i) communicating information request data via the token framework to one or more of the certification systems, the information request data representing an identity of a requestor and a certified request of the requestor to receive specified requested data; and (ii) receiving in return the requested data via the token framework, if the request is certified by the respective certification system.

According to some embodiments the method further comprises storing the received requested data, at least in parts, into one or more distributed ledgers.

According to some embodiments the method further comprises identifying, by means of the token framework, one or more data sources from which the requested data may be retained and communicating the information request data selectively to these one or more to data sources.

According to some embodiments the method further comprises: (i) receiving information request data via the token framework, the information request data representing an identity of a requestor and a certified request of the requestor to receive specified requested data; and (ii) communicating in return the requested data via the token framework.

According to some embodiments at least one of the object identification data, the inspection certification data, the non-certified utility token validation request data, the utility token certification data, the information request data, and the requested data is communicated, received or stored, respectively, in the form of data being embodied in a token.

An eighth aspect of the invention is directed to a system for tokenization of a process result, the system being configured to perform the method of the seventh aspect.

A ninth aspect of the invention is directed to a computer program for tokenization of a process result, the computer program comprising instructions which when executed on a processing platform of system of the eighth aspect cause the system to perform the method of the seventh aspect.

Another aspect of the invention is directed to a token comprising object identification data comprising at least one cryptographic hash value as a collision-resistant virtual representation of the physical object.

The various above-mentioned aspects and embodiments can be arbitrarily combined with each other or with other aspects of the present invention, unless such combination is explicitly excluded or technically impossible.

Any computer program mentioned herein may in particular be implemented in the form of a non-transient storage medium on which one or more programs for performing the respective method implemented by the computer program are stored. Preferably, this is a data carrier, such as a CD, a DVD or a flash memory module. This may be advantageous, if the computer program product is meant to be traded as an individual product in individual product independent from the processor platform on which the one or more programs are to be executed. In another implementation, the computer program product is provided as a file on a data processing unit, in particular on a server, and can be down-loaded via a data connection, e.g. the Internet or a dedicated data connection, such as a proprietary or local area network.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

BRIEF DESCRIPTION OF THE DRAWINGS

Further advantages, features and applications of the present invention are provided in the following detailed description and the appended figures, wherein:

FIG. 9 shows exemplary structures and content of an asset token and a utility token useable in connection with the methods described herein.

DETAILED DESCRIPTION OF EMBODIMENTS

Figure 1:
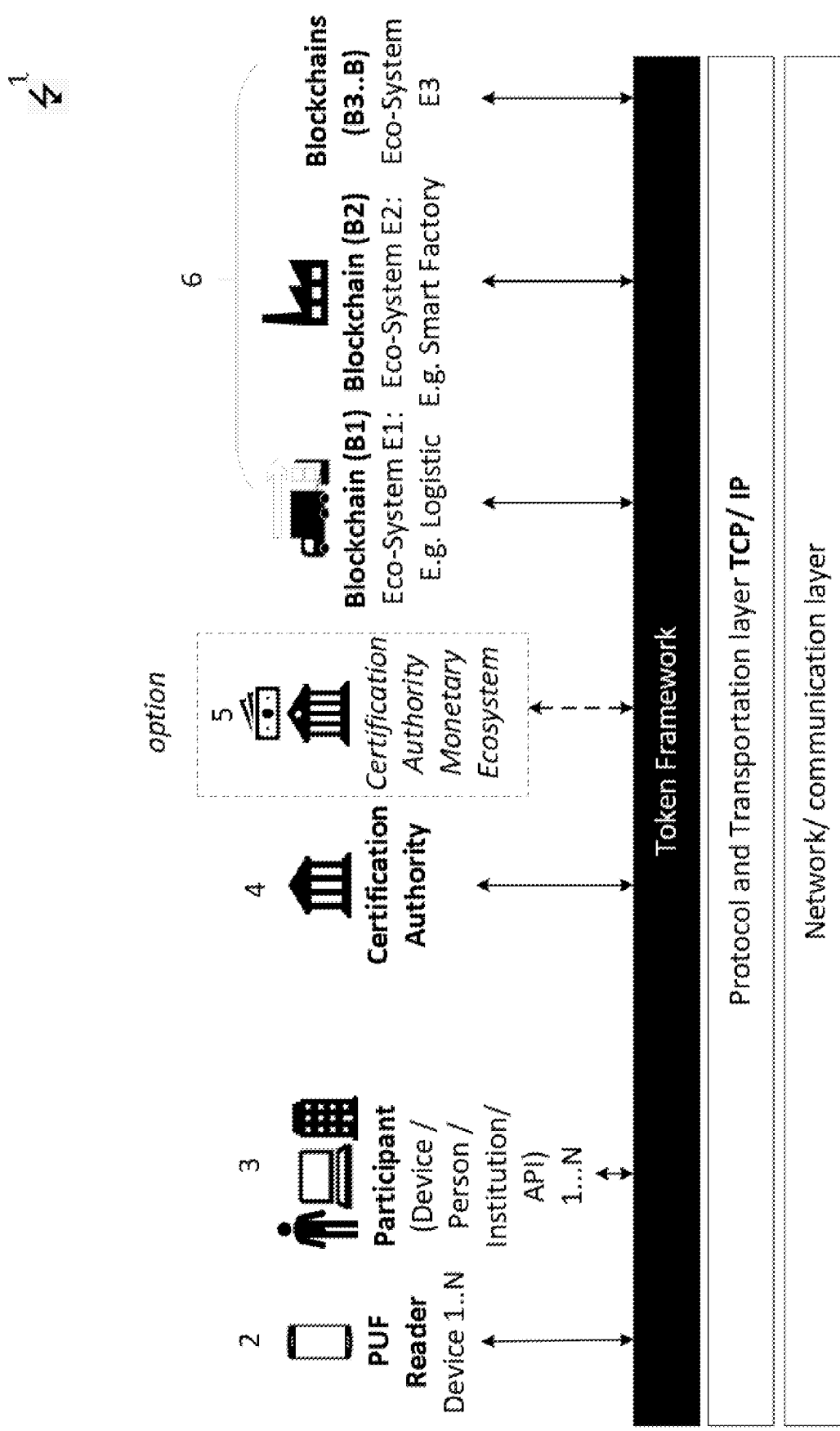
FIG. 1 schematically illustrates an overall communication structure used to communicate by means of tokens among various participants in the token-based ecosystem, according to preferred embodiments of the present invention.

Generally, participants of the token-based ecosystem 1 as illustrated in FIG. 1 may comprise (i) various different devices 2, e.g. PUF readers for reading one or more PUFs of a physical object, (ii) other participants 3, such as other devices, individuals, institutions or application program interfaces (API), (ii) certification authorities 4 with their respective certification systems, (iii) gateways to other token-based ecosystems 5, e.g. monetary ecosystems, and (iv) one or more distributed ledgers 6, such as blockchains, which may belong to one or more different token-based eco-systems.

The communication may particularly be based on Internet technology and will typically be over the Internet or other communication networks. On the lower levels 7, 8, well-known protocol stacks, such as protocol stacks employing low-level transport technologies such as ethernet, DSL, cellular wireless communication, SONET/SDH etc. and TCP/IP or other well-known protocols on transportation layers (layers three and four of the OSI model). In addition, a token framework 9 is added as another communication layer which enables the token-based communication among the devices and other participants in the token-based ecosystem. Specifically, the token framework 9 may define and require a particular data format for the tokens to be used in connection therewith and may in addition have a gateway function based on which a received token requesting information can be guided, in the sense of routing, to a suitable other participant that can actually provide the information, wherein such routing is made based on information being available to the token framework.

In the following description of the further figures, reference is made to the elements described above in connection with FIG. 1.

Figure 2:
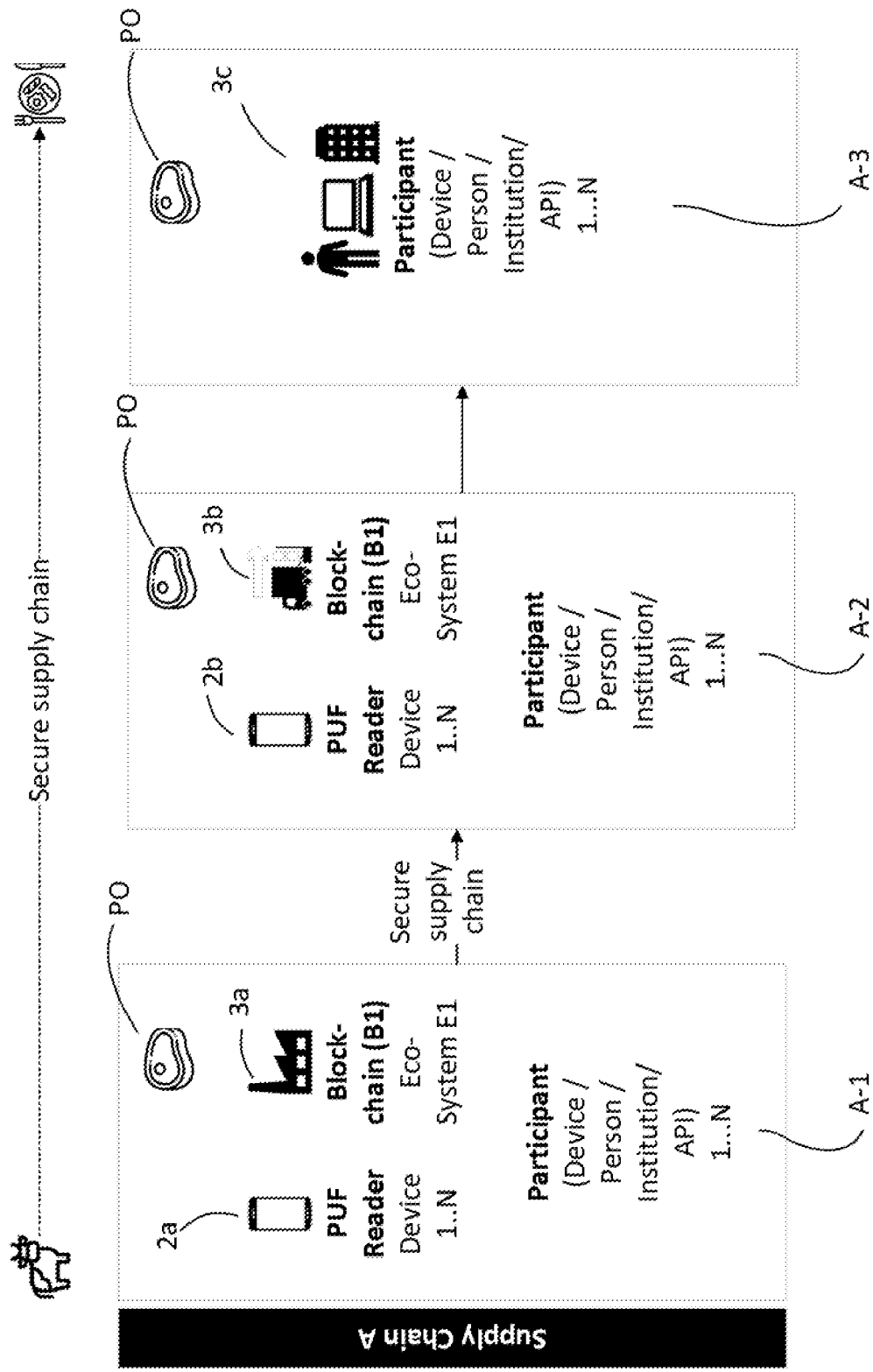
FIG. 2 schematically illustrates an exemplary supply chain A related to a method of tokenization of a physical object according to embodiments of the present invention.

Referring to FIG. 2 an exemplary first supply chain A related to a first ecosystem E1 has a first distributed ledger, e.g. blockchain B1, assigned thereto. The supply chain A may particularly be related to tracing physical objects PO1 in the form meat products being produced at a first node A-1 of E1, such as for example a meat production site 3*a*, e.g. a farm. Before supplying the meat products along the supply chain A, the production site 3*a* applies for example one or more PUF readers 2*a* to detect one or more PUFs being attached to or otherwise connected or embedded in the meat product PO1 in order to generate object identification data and process same for the purpose of generating a token representing it, according to a method described below in connection with FIG. 3. Specifically, a token represented the object identification data is generated and stored or caused to be stored in the blockchain B1 related to the first ecosystem E1.

Similarly, when the meat product has been transported along the supply chain A to a further nodes A-2 (in the illustrated example there are only three nodes altogether, while generally there may be any number of nodes) an examination of the product takes place at node A-2 using a similar technology in order to confirm the authenticity of the product. This authentication may for example be performed by a participant 3*b* according to the methods and with devices described in any one of the European patent applications cited above in the BACKGROUND section. The node A-2 may then stores or cause to be stored its authentication result together with meta data, such as time and venue of the authentication, to into blockchain B1.

Some of the nodes, in the present example this is the final node A-3 (with participant 3*c*) may omit such authentication altogether or may use a simpler form, such as a mere scanning of a barcode or other identity available on the product in order to identify it and optionally retrieve product information related to the product or its travel along the supply chain from one or more distributed ledgers or other data repositories related to the first ecosystem E1.

Figure 3:
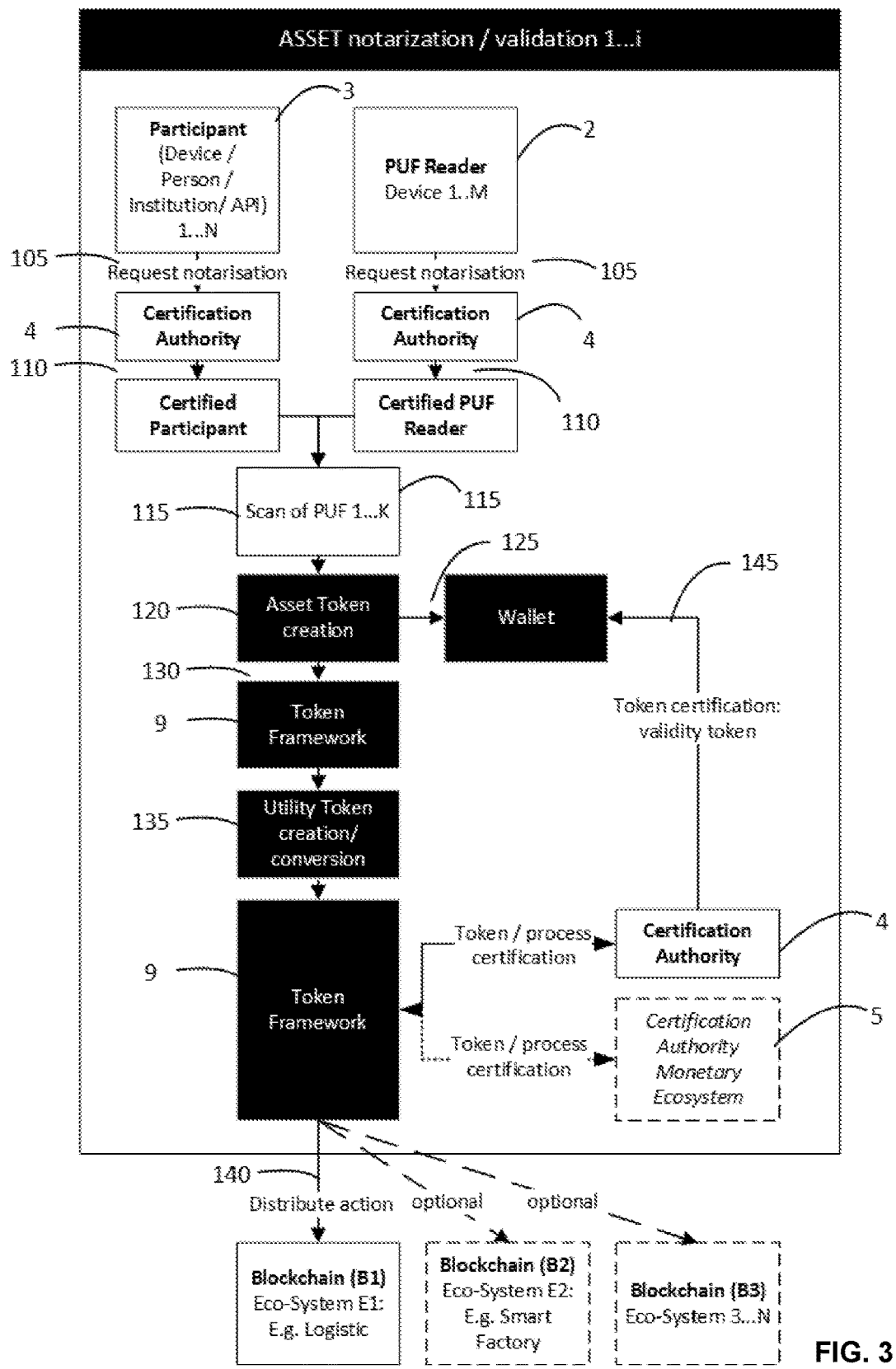
FIG. 3 shows a flowchart illustrating an exemplary method of tokenization of a physical object, according to embodiments of the present invention.

Referring to FIG. 3, an exemplary method 100 ("case 1") of tokenization of a physical object within a single token-based ecosystem, e.g. ecosystem E1, comprises an initial phase comprising steps 105 and 110, where devices or other participants contributing to the method are certified. In this example, the physical object PO to be tokenized comprises a number M of PUFs, with $M \in \mathbb{N}$, and consequently there may be up to M PUF readers being employed to read the respective PUFs. Furthermore, there are $N \in \mathbb{N}$ other participants, e.g. operators of respective PUF readers contributing to the tokenization process. During the initial phase, each of the participants, including the PUF readers, sends in step 105 a tokenized request to a certification system 4 of a certification authority assigned to the ecosystem El in order to receive a respective in step 110 a certification and thus become a certified participant, This is a prerequisite for being able to participate as a participant in the subsequent tokenization process relating to the physical object.

In a next step 115, which initiates a second phase of the process 100, one of more PUFs of the physical object PO1 are being scanned by means of the respective PUF readers being employed by the respective persons/institutions acting as participants. This scanning may for example be performed according to the methods and with devices described in any one of the European patent applications cited above in the BACKGROUND section. This scanning process results in unique identification data relating to the physical object PO1, particularly in a collision resistant and preferably digitally signed hash code (also referred to as "object secret" herein) representing the identity of the physical object.

In a subsequent step 120, a non-certified token is generated which may particularly be referred to as a non-certified asset token. This non-certified token is a data structure defined according to a particular, preferably standardized, data format (token format), e.g. the token format illustrated in FIG. 9(*a*). In addition, non-certified token will typically further information, such as (i) an indication of the type of token, (ii) object or asset identification serving as an ID of the token, (iii) an identifier of the token framework being used, particularly if multiple different frameworks are available within or in connection with the ecosystem E1, (iv) a public key of a PKI-system of the owner of the token, e.g. the entity that has created it, which at the same time may serve as an identify of the owner, and, preferably encrypted, further information related to the physical object, e.g. a related amount, owner, kind of object, process performed in relation to it, etc., as illustrated in FIG. 9(a). The token also includes certificates for the various participant having been certified during the initial phase of the process.

The non-certified token is then stored in a step 125 into a protected data repository, preferably in a digital wallet, being assigned to the system performing method 100, which system may in particular include one or more of the PUF reader devices used to scan the physical object PO1. Furthermore, in a step 130, the non-certified token is provided to the token framework 9, where it is converted into a utility token which may specifically have the token format illustrated in FIG. 9(b).

A key difference between the two token formats illustrated in FIG. 9 is that unlike the asset token format shown in FIG. 9(a), the utility token format of FIG. 9(b) has two extra data fields which are reserved for (i) information indicating an action or process to which the utility token is assigned and (ii) one or more resources, e.g. devices or (other) participants, being affected by the action or process, respectively. Thus, the asset token format is particularly suitable and intended to relate to a token representing an asset, such as a physical object, as such, while a utility token format is particularly suitable and intended to relate to a token representing an action or process, at least in parts.

In a step 135, the token framework then sends the utility token (referred to herein as "non-certified token validation request (data)") resulting from the conversion of the non-certified (asset) token to one or more relevant certification systems 4, 5 to request thereby a certification of the non-certified token to which the utility token pertains, the request being identified in the action and resource data fields of the utility token, as described above.

Optionally, in a step 140, the utility token may in addition be stored into one or more distributed ledgers, preferably including the distributed ledger assigned to ecosystem E1, e.g. blockchain B1.

The respective certification systems verify the non-certified token validation request (data), including based on the participant certificates included in the utility token, the hash value and thus identity of the physical object PO1 and preferably further information included in the utility token, as described above and with reference to FIG. 9(b). If the verification is successful, the respective certification system communicates token certification data, preferably by way of returning the utility token and including respective certification data therein as a certificate, or otherwise, the certification data representing a certification of the previously non-certified token by the respective certification system.

In a step 145, the certification data is received at the entity or device having issued the validation request and stored in the protected data repository, e.g. digital wallet in the form of a (now) certified asset token. Specifically, this may be achieved by adding the respective one or more certificates contained in the received certification data into a respective data field of the previously non-certified token stored in the data repository, thus converting it into a certified (asset) token.

Accordingly, method 100 provides a way of tokenizing physical object PO1 by way of creating a certified (asset) token representing it within the related one or more token-based ecosystems.

Figure 4:
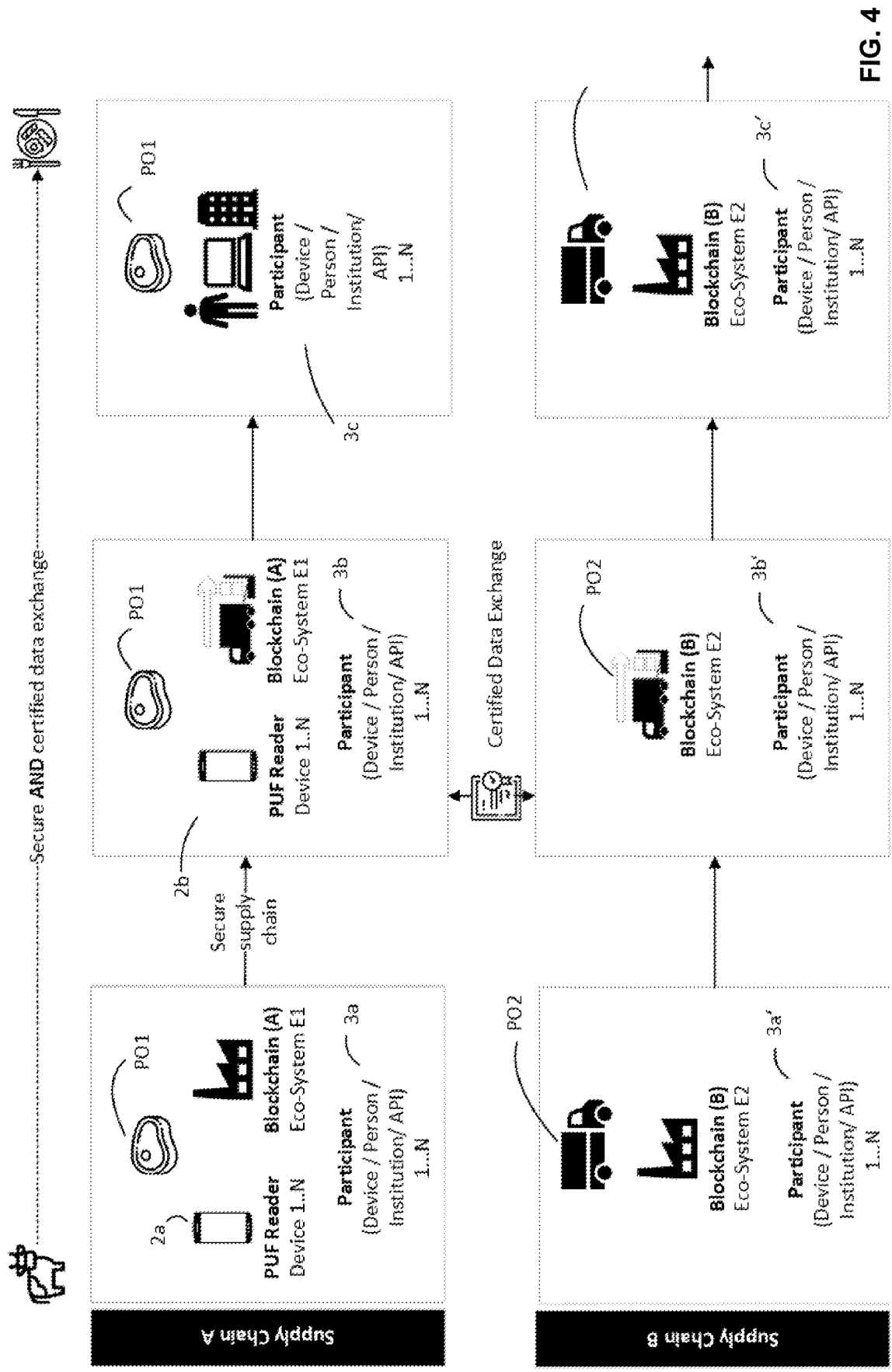
FIG. 4 schematically illustrates a set of two exemplary supply chains A and B, supply chain A being related to a method of tokenization of a first physical object PO1 in a first ecosystem E1 and supply chain B being related to a method of tokenization of a second physical object PO2 in a second, different ecosystem E2, according to embodiments of the present invention.

FIG. 4 schematically illustrates a set of two exemplary supply chains A and B, supply chain A being related to a method of tokenization of a first physical object PO1 in a first ecosystem E1 and supply chain B being related to a method of tokenization of a second physical object PO2 in a second, different ecosystem E2. Supply chain A corresponds to that of FIGS. 2 and 3. Supply chain B may for example represent a logistics chain used to enable the supply chain A. The corresponding token-based ecosystem E2 may particularly comprise a distributed ledger, e.g. another blockchain, B2. The data being stored therein in the form of (asset) tokens may particularly relate to physical objects PO2, such as a cooling chamber of a vehicle used to supply the PO1 along supply chain A and may have participants 3a', 3b' and 3c' related to its nodes. The interoperability between the two ecosystems is necessary, if data being available in one of the two ecosystems needs to be made available to the respective other ecosystem by way of exchanging one or more tokens between the ecosystems in a certified and thus secure way.

Figure 5:
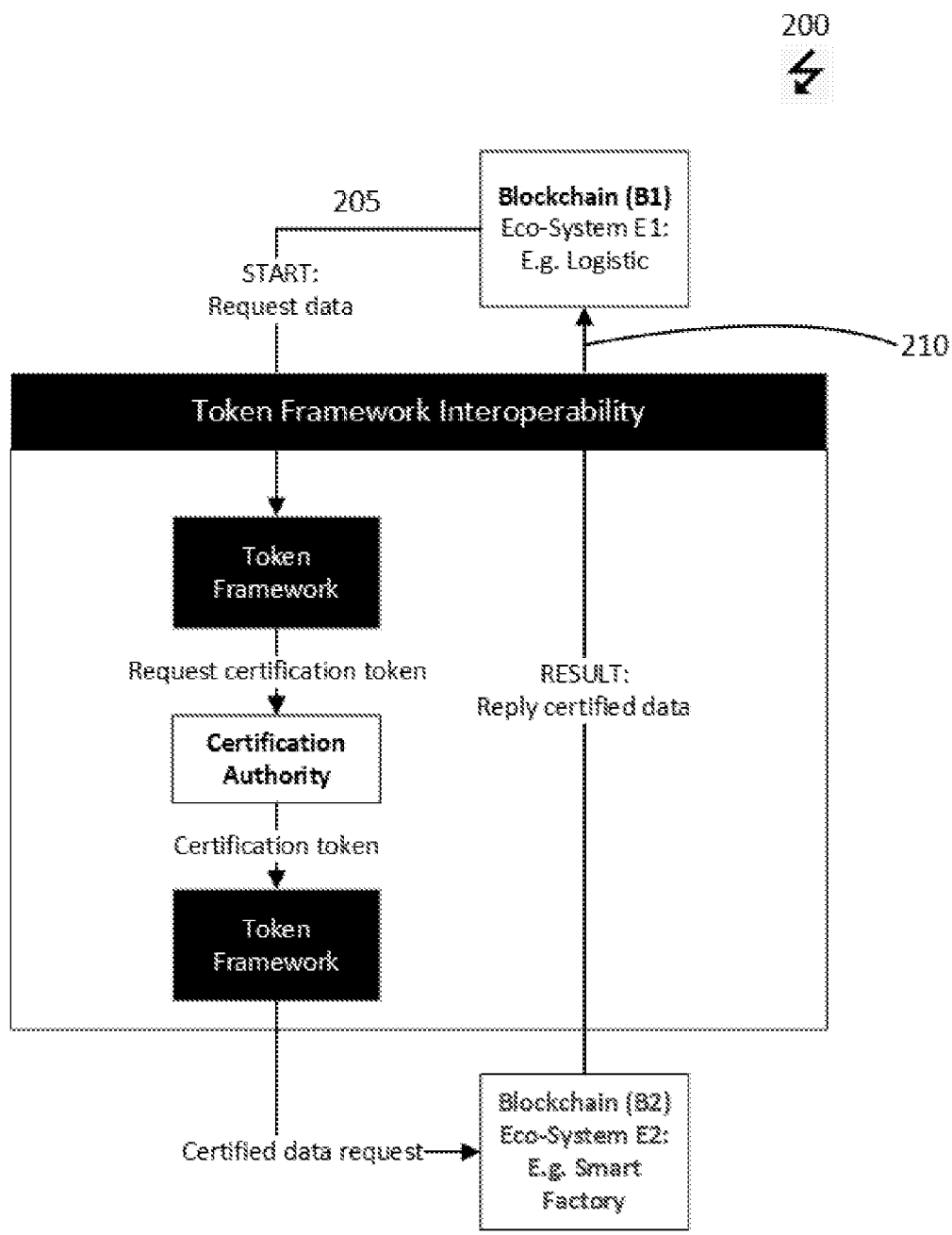
FIG. 5 shows a flowchart illustrating an exemplary method of providing token-based interoperability between the two ecosystems E1 and E2 of FIG. 4, according to embodiments of the present invention.

FIG. 5 shows a flow chart illustrating a method 200 that can be used to implement said interoperability. In the present example, a component of ecosystem E1 needs and requests data being only available in ecosystem E2. Generally, in a step 205, the component of E1 send a utility token representing the request via the token framework 9, which spans and is available in both ecosystems, to a competent certification system 4. Specifically, the token framework may have in addition the functionality to identify the correct certification system for the request amongst a set of multiple certification systems being addressable via the token framework and direct the utility token to said correct certification system, which the certifies the request and thus the utility token, if the conditions for a certification are met. The token framework may further have the functionality to identify the correct recipient for the certified request that can make the requested information available, e.g. blockchain B2, amongst a set of different components of E2 or even one or more other ecosystems E3 etc.

When the correct recipient receives the request, i.e. the certified utility token, it retrieves the requested information and sends it via the token framework to the requesting entity in ecosystem 1, which receives it in a further step 210.

Figure 6:
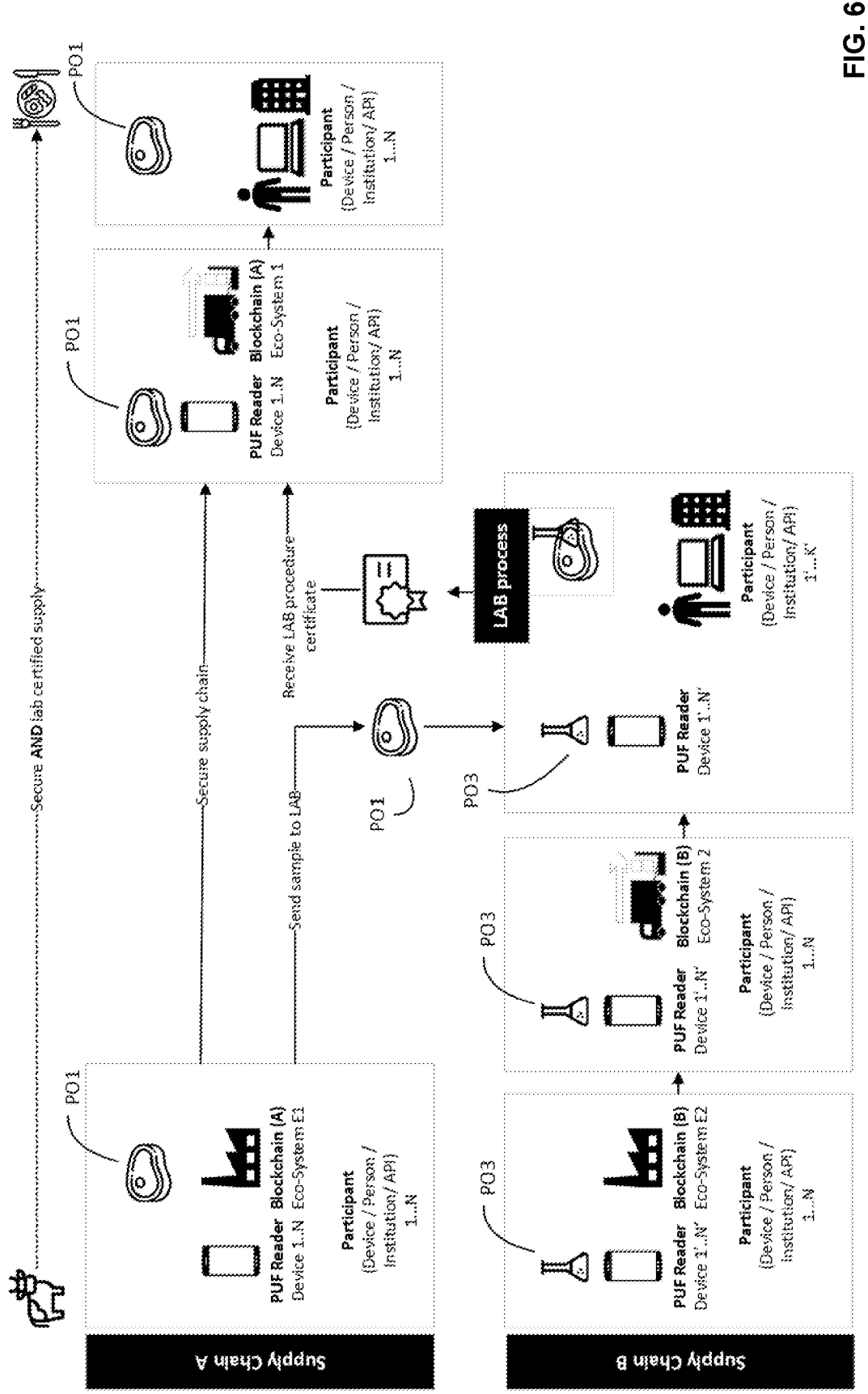
FIG. 6 schematically illustrates a linkage of two exemplary supply chains A and B, supply chain A being related to a method of tokenization of a first physical object PO1 in a first ecosystem E1 and supply chain B being related to a method of tokenization of a second physical object PO2 in a second, different ecosystem E2, according to embodiments of the present invention.

FIG. 6 schematically illustrates a linkage of two exemplary supply chains A and B, supply chain A being related to a method of tokenization of a first physical object PO1 in a first ecosystem E1 and supply chain B being related to a method of tokenization of a second physical object PO3 in a second, different ecosystem E2. Supply chain A corresponds to that of FIGS. 2 and 3. Supply chain B may for example represent a process chain used to supply a second physical object PO3 used to test the first physical object PO1 being supplied along supply chain A and for the purpose of testing to PO3 may particularly be a disposable (product) used for testing the meat product PO1, e.g. a cuvette. The corresponding token-based ecosystem E2 may particularly comprise a distributed ledger, e.g. another blockchain, B2. The data being stored therein in the form of (asset) tokens may particularly relate to the physical objects PO3, such as said disposables. As in the case of FIGS. 4 and 5, interoperability between the two ecosystems is necessary, as here data being available in one of the two ecosystems needs to be made available to the respective other ecosystem by way of exchanging one or more tokens between the ecosystems in a certified and thus secure way. FIG. 6 is particularly related to a scenario, where results of the process being performed in ecosystem 2 are to be linked in a tokenized and certified way into ecosystem E1.

Figure 7:
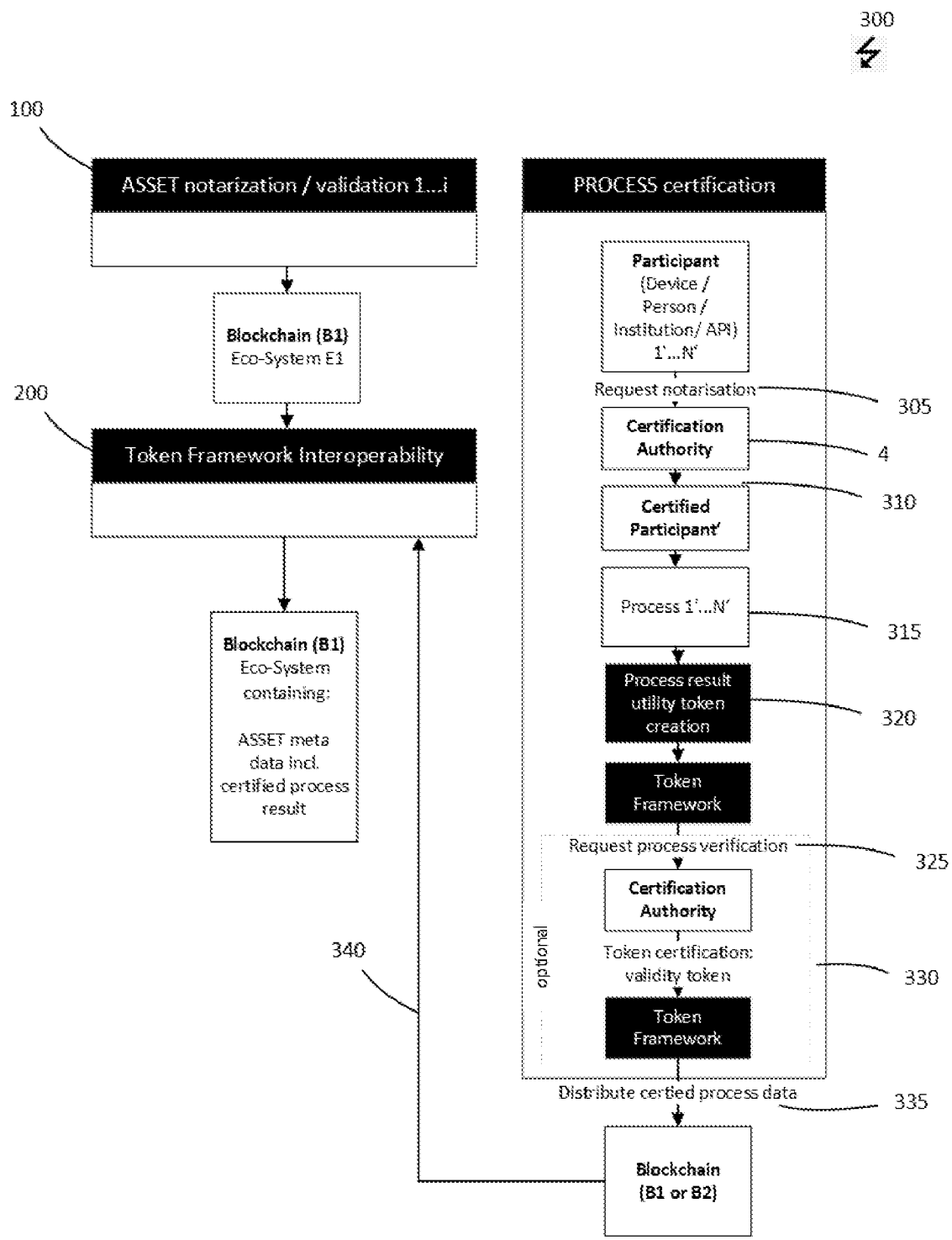
FIG. 7 shows a flowchart illustrating an exemplary method of providing token-based linkage of data between the two ecosystems E1 and E2 of FIG. 6, according to embodiments of the present invention.

FIG. 7 shows a flowchart illustrating an exemplary method 300 of providing token-based linkage of data between the two ecosystems E1 and E2 of FIG. 6, according to embodiments of the present invention.

Referring to FIGS. 6 and 7, on the one hand, for supply chains A/ecosystem E1, method 100 is performed in relation to the related physical objects PO1, as described above in order to tokenize the physical object PO1, i.e. in the present non-limiting example, the meat product. The resulting certified token is thereby stored into blockchain B1.

On the other hand, for supply chain B/ecosystem E2, the test process results need to be certified and tokenized, which involves certification of the disposable PO3 needed to perform the test. The process for tokenizing the process result comprises steps 305 to 335 of FIG. 7.

Based on a request issued via the token framework 9 by ecosystem E1, the certified test process result is provided by means of the interoperability method 200 of FIG. 5 to ecosystem E1 wherein it is received in a step 340 and stored in blockchain B1, e.g. within a respective asset token related to the physical Object PO1.

Figure 8:
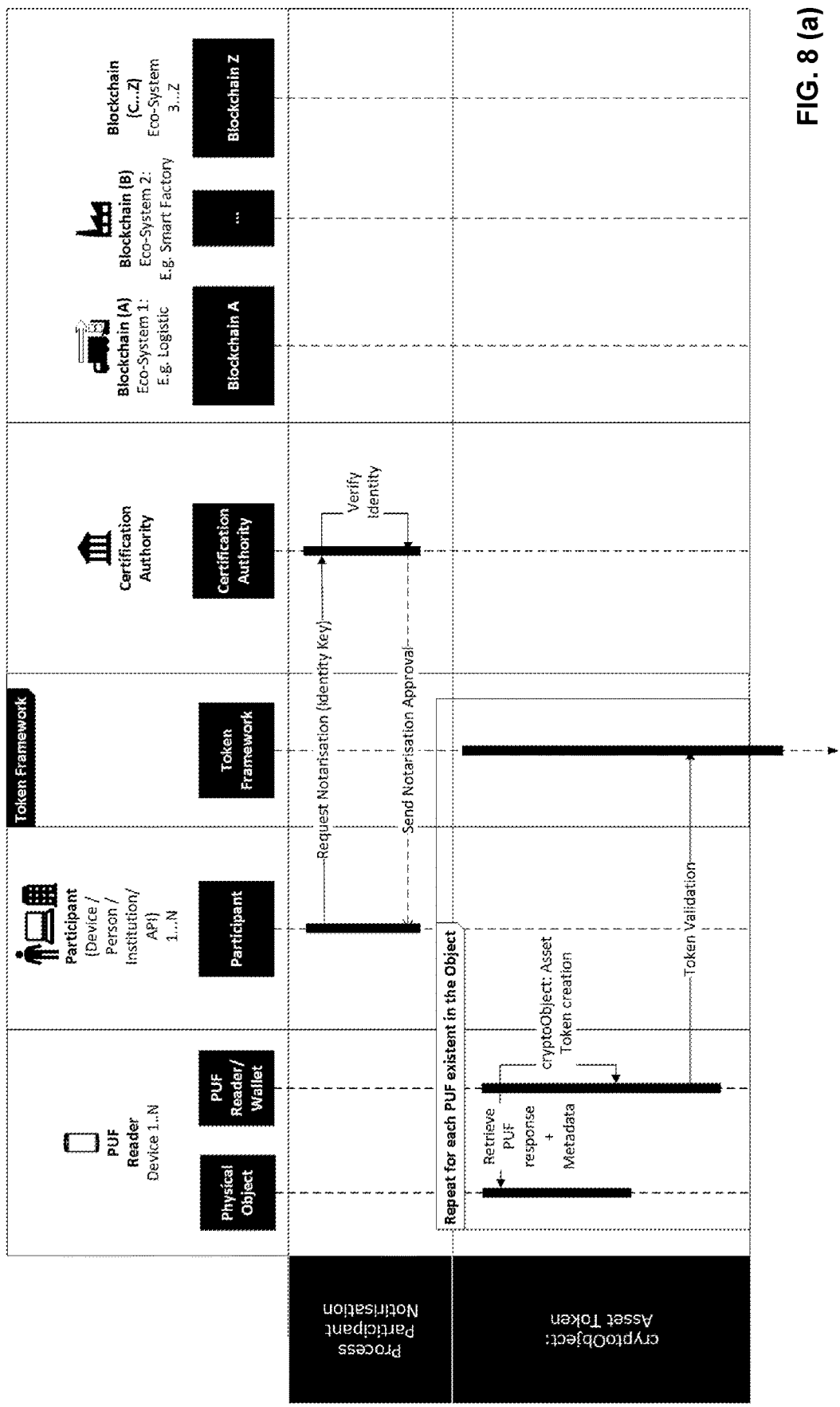
FIGS. 8*a*, 8*b*, 8*c* in combination show another flow chart illustrating the interplay of the methods of FIGS. 2 to 7 in a consolidated manner.
Figure 8:
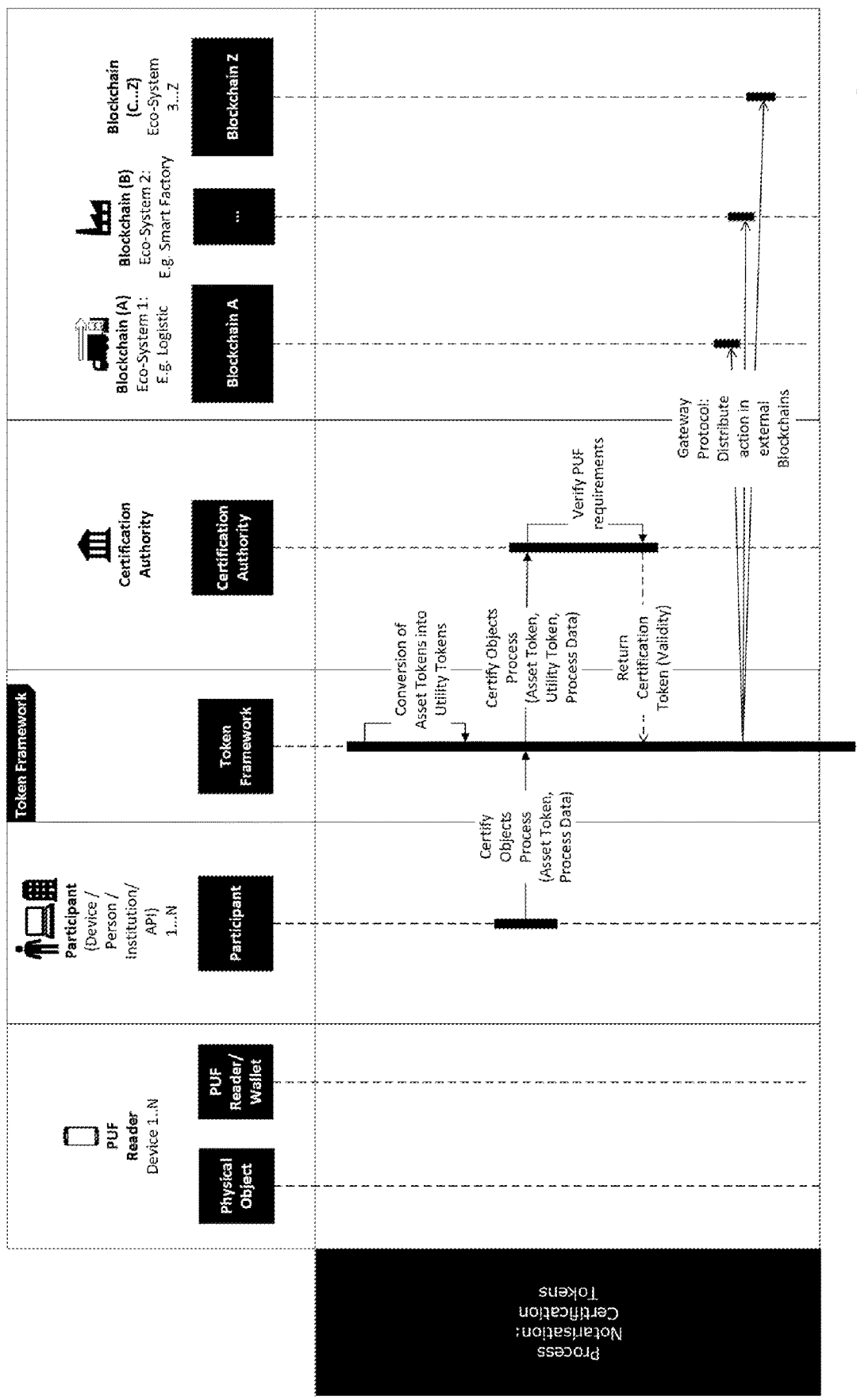
Figure 8:
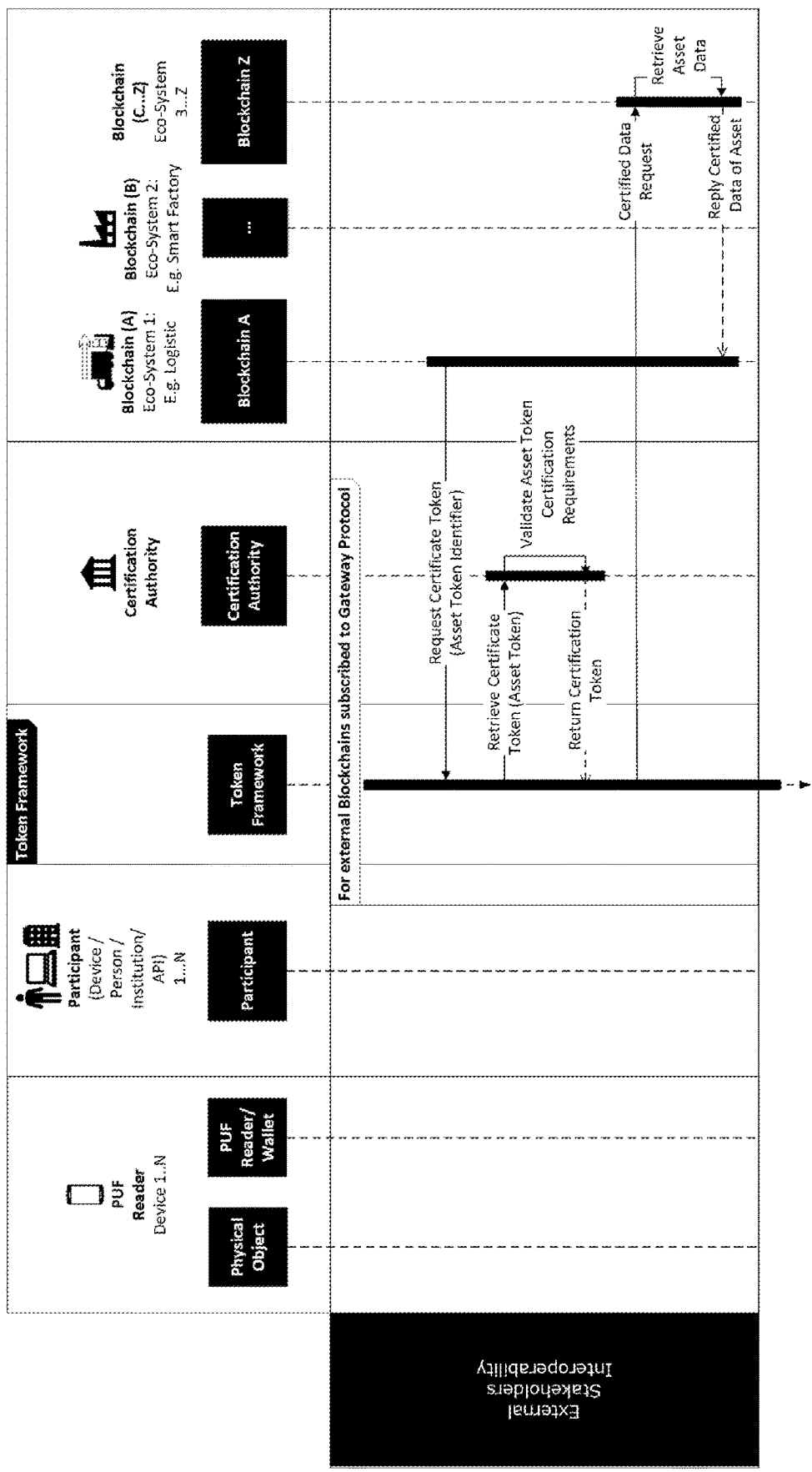

FIGS. 8a-8c together show a flow chart illustrating the interplay of the methods of FIGS. 2 to 7 in a consolidated manner, representing a basic kind of an UML (unified modelling language) diagram giving a software-process-architectural overview of the invention.

The process starts with the tokenization of a physical object. This first process phase is performed by a reader device in relation to a physical object, which together define a product manufacturing environment. At first, the physical object is captured, as described in our previous applications, particularly by way of reading a PUF or by the crypto objects concept. As a result, a collision resistant hash value or even a digital signature thereof is created and stored locally into a wallet being assigned to the reader device.

As a next step, based on this information, a preliminary asset token is created within the product manufacturing environment, which preliminary asset token is essentially a data structure of a given predefined token format (standardized) which includes as a minimum said hash value or digital signature and an information indicating a token value that's being assigned to the physical object.

Once this preliminary asset token is created, as a next step, this token needs to be validated, which involves a so-called token validation. Essentially, this means that the existence of the newly generated preliminary asset token is provided via a protocol framework referred to as a "token framework" to a central certification authority in such a way that this central certification authority can relate to that token. The central certification authority then initiates a validation process, which may include, on the one hand, checking whether for the respective object there is a previous asset token and thus a potential collision, in which case the preliminary token would not be transformed into a final certified asset token, i.e. would not be notarized as asset token. Furthermore, the validation process may involve a commercial validation aspect, which is however not the subject of the present invention.

If the validation is successful, the central certification authority communicates that finding back to the product manufacturing environment, namely to the wallet associated with the reader device and as a consequence, the preliminary asset token is transformed into a (non-preliminary) certified asset token, which transformation includes confirming the value being assigned thereto. In addition, the central certification authority stores or causes to be stored the information it has received, and which is related to that token into a distributed ledger environment that is assigned to the product manufacturing environment (home environment, e.g. home DLT). For example, in the case of ecosystem E1 being the asset generator, this could be a blockchain or other storage environment controlled by E1. In summary, this initial part of the process results in a "notarized" object being represented by the respective validated asset token. The main role of the asset token is to conserve the originally generated token related to the physical object as a basis for the commercialization of said object.

A second, optional, process phase relates to the generation of a so-called utility token. In fact, if the above-mentioned commercialization aspect is not relevant, the asset token may also take the role of the utility token, i.e. if the conservation of the originally generated token is not relevant. On the other hand, if such conservation is relevant, that utility token is playing the role of a variable token that can be used for the implementation, in particular, of the interoperability, that will be described below in relation to the third aspect of the overall process. The original asset token remains unchanged.

The second process phase serves the purpose of certifying, by means of creating a respective utility token, the process of creating the asset tokens which may involve, in particular, certifying that process as such and the devices being used by the process, such as the reader device. Specifically, there may be more than one certification related to the reader device or different aspects thereof.

Referring to the value chain diagrams (FIGS. 2, 4 and 6), the first process phase would be used for both the value chain related to the production of the meat and the other value chain related to the test/certification of that meat. Accordingly, the second phase of the process is also applicable particularly to that second aspect related for example to lab equipment and its certification (FIGS. 6 and 7).

The certification process according to the second process phase involves conversion of the asset token into a utility token, or in other words, generating a copy of the asset token which will from then on be used as a means to implement, in particular, the interoperability described in detail in relation to the third phase of the process. In this way, the original asset token may be conserved, while the flexibility of that utility model can be used to contain variable data, as needed during the interoperable phase, even in the case that there is only a single blockchain environment. A further role of the utility token is that of a standardized data structure that comprises either object and/or process related data such or one or more pointers to other data structures, where such data is available. Such other data structures may particularly be outside of the home environment, e.g. central DB (database) or home DLT (distributed ledger technology) (e.g. blockchain ecosystem E1), of which the utility asset forms a part. The technical structure of the utility token is identical to that of the asset token, i.e. a data structure that includes both the object-related anchor, i.e. hash value or digital signature thereof, and one or more additional data fields which may for example contain object or process related data or pointers thereto.

The certification process is used on the one hand in a first mode, which may for example be indicated by a respective flag contained in the data transmitted to the central certification authority, wherein as a part of the initialization the hash value or respective digital signature created during the asset token creation process is stored in the central certification authority, which is itself a DLT or including a DLT controlled by it. This initialization serves to provide a basis for a subsequent verification were stored hash value/digital signature is used for comparing it with a respective value/digital signature derived from an object to be authenticated in the field.

On the other hand, the certification process is used in a second mode during the actual verification of such object, wherein the utility token (and optionally additional process data) related to the object to be authenticated is communicated via the token framework to the central certification authority which in response verifies the content of the utility token by comparing it to the reference information being stored during the initialization process (cf. European Patent Applications: EP 3 340 213 A1, EP 3 340 212 A1, EP 18170044.4, EP 18170047.7, and EP 18214512.8) and delivers a verification result in return (return certification token) (validity), the latter being the utility token (including a further entry certifying the verification result). The verification process may also be called a smart contract, because essentially both on the technical and the commercial level that is what it essentially is. Then, the returned utility token is stored into the data repository of the home environment, e.g. home DLT, which may particularly be initiated by the central certification authority.

A third process phase relates to interoperability, wherein a requester pertaining to another environment, e.g. an environment controlled by another entity than the entity creating the original asset/utility token, requests information being available in said first environment. Accordingly, such a request is issued by that other environment, for example by a DLT related to that environment. The request is received at the first environment and before the latter submits the requested data, it initiates a verification process by sending a verification request via the token framework layer to the central certification authority, the request including a utility token comprising information indicating the identity of the requester and the requested information. The central certification authority then verifies the request, including by examining whether the requester is admitted to the process and authorized to receive the requested information (per smart contract, therefore the central certification authority has to involve a DLT). If that is the case, the central certification authority (optionally) identifies, based on the received information, the proper source of the requested information among all registered environments and returns a respective certification token indicating a successful certification. Otherwise, the return certification token indicates that the verification has failed. Then, depending on the certification result indicated in the return certification token the requested information is provided within a respective utility token by the first environment to the requesting environment.

Optionally, the overall process further comprises a process device notarization process phase at the beginning of the overall process, wherein the reader device itself is being certified by identifying itself to the central certification authority, which then verifies the identity of the reader device against reference data and returns a respective notarization to approval or denial to the reader device. The use of the reader device for the above-described processes is dependent on a successful notarization approval, because in the process of verifying a physical object, the reader device has to also provide its notarization certificate to the central certification authority which then decides on the verification including based on that notarization certificate.

While above at least one exemplary embodiment of the present invention has been described, it has to be noted that a great number of variations thereto exists. Furthermore, it is appreciated that the described exemplary embodiments only illustrate non-limiting examples of how the present invention can be implemented and that it is not intended to limit the scope, the application or the configuration of the herein-described apparatus' and methods. Rather, the preceding description will provide the person skilled in the art with constructions for implementing at least one exemplary embodiment of the invention, wherein it has to be understood that various changes of functionality and the arrangement of the elements of the exemplary embodiment can be made, without deviating from the subject-matter defined by the appended claims and their legal equivalents.

The invention claimed is:

1. A computer-implemented method of tokenization of a physical object, the method comprising:
   (a) generating or receiving reference object identification data based on an inspection of the physical object, the object identification data comprising at least one cryptographic hash value as a collision-resistant virtual representation of the physical object;
   (b) receiving, from a requesting system via a token framework, non-certified token validation request data representing:
      object identification data relating to a specific physical object and comprising at least one cryptographic hash value as a collision-resistant virtual representation of the physical object, and
      information indicating the creation of a non-certified token in relation to the object identification data and a request to have the non-certified token validated;
   (c) correlating the object identification data with the reference object identification data with respect to a specified matching criterion;
   (d) in response to the object identification data matching the reference object identification data according to the matching criterion, communicating, via the token framework, token certification data representing a certification of the previously non-certified token to the requesting system;
   repeating steps (a) through (d) for a plurality of physical objects resulting in a plurality of certified physical objects;
   generating or receiving process result data representing a result of an interaction of the plurality of certified physical objects;
   generating a non-certified token being assigned to and representing the process result data;
   communicating non-certified token validation request data via the token framework to one or more certification systems, the non-certified token validation request data representing information indicating the creation of the non-certified token in relation to the object identification data and a request to have the non-certified token validated;
   receiving token certification data representing a certification of the previously non-certified token by at least one of the certification systems;
   storing the certification data into:
      the non-certified token to convert the non-certified token into a certified token being certified by and with respect to each of the certifications represented by the token certification data, or
      a different token being derived from the non-certified token and thereby certifying the different token with respect to each of the certifications represented by the token certification data; and
   storing the certified token and/or metadata related to the object identification data in a protected data repository.

2. The method of claim 1, further comprising:
   generating or receiving inspection certification data representing a respective certification of one or more object inspection systems used for generating the object identification data, and/or of one or more inspection participants, each inspection participant being a device, person or institution related to one or more of the object inspection systems or their operation; and including the inspection certification data in the non-certified token validation request data before communicating it to the one or more certification systems.

3. The method of claim 1, further comprising:

creating, within the token framework, a utility token based on the non-certified token, the utility token comprising data representing a resource and an action the resource is thereby requested to perform, wherein communicating the non-certified token validation request data comprises incorporating the request to have the non-certified token validated at least in part in the utility token and communicating the utility token to the certification system.

4. The method of claim 1, further comprising:

communicating information request data via the token framework to the one or more certification systems, the information request data representing an identity of a requestor and a certified request of the requestor to receive specified requested data; and receiving, in return, the requested data via the token framework, if the request is certified by the respective certification system.

5. The method of claim 4, further comprising:

storing the received requested data, at least in parts, into one or more distributed ledgers.

6. The method of claim 4, further comprising:

identifying, by means of the token framework, one or more data sources from which the requested data may be retained and communicating the information request data selectively to these one or more data sources.

7. The method of claim 1, further comprising:

receiving information request data via the token framework, the information request data representing an identity of a requestor and a certified request of the requestor to receive specified requested data; and communicating in return the requested data via the token framework.

8. The method of claim 1, wherein at least one of the object identification data, inspection certification data, the non-certified token validation request data, the token certification data, information request data, and the requested data is communicated, received or stored, respectively, in the form of data being embodied in a token.

9. A system for tokenization of a physical object, the system including one or more processors being configured to perform the method of claim 1.

10. A non-transitory computer-readable medium having stored thereon computer-readable instructions for carrying out the method of claim 1.

11. A system for certifying a token including object identification data, the system comprising:

one or more processors; and memory including instructions which when executed by the one or more processors, cause the processor to:

(a) receive or generate and store reference object identification data relating to a specific physical reference object and comprising at least one cryptographic hash value as a collision-resistant virtual representation of the physical reference object;

(b) receive, from a requesting system via a token framework, non-certified token validation request data representing:

object identification data relating to a specific physical object and comprising at least one cryptographic hash value as a collision-resistant virtual representation of the physical object, and information indicating the creation of a non-certified token in relation to the object identification data and a request to have the non-certified token validated;

(c) correlate the object identification data with the reference object identification data with respect to a specified matching criterion;

(d) according to the matching criterion the object identification data matches the reference object identification data, communicate via a token framework token certification data representing a certification of the previously non-certified token to the requesting system;

repeat steps (a) through (d) for a plurality of physical objects resulting in a plurality of certified physical objects;

generate or receive process result data representing a result of an interaction of the plurality of certified physical objects;

generate a non-certified utility token being assigned to and including the process result data;

communicate non-certified utility token validation request data via the token framework to one or more certification systems, the non-certified utility token validation request data representing information indicating the creation of the non-certified utility token in relation to the process result data and a request to have the non-certified token validated;

receive token certification data representing a certification of the previously non-certified utility token by at least one of the certification systems;

store the certification data into:

the non-certified utility token to convert the non-certified utility token into a certified utility token being certified by and with respect to each of the certifications represented by the token certification data, or a different utility token being derived from the non-certified utility token and thereby certifying the different utility token with respect to each of the certifications represented by the token certification data; and store the certified utility token and/or metadata related to the certified process in a protected data repository.

12. A computer-implemented method of tokenization of a process, the method comprising:

(a) receiving or generating and storing reference object identification data relating to a specific physical reference object and comprising at least one cryptographic hash value as a collision-resistant virtual representation of the physical reference object;

(b) receiving, from a requesting system via a token framework, non-certified token validation request data representing:

object identification data relating to a specific physical object and comprising at least one cryptographic hash value as a collision-resistant virtual representation of the physical object, and information indicating the creation of a non-certified token in relation to the object identification data and a request to have the non-certified token validated;

(c) correlating the object identification data with the reference object identification data with respect to a specified matching criterion;

(d) in response to the object identification data matching the reference object identification data according to the matching criterion, communicating, via a token framework, token certification data representing a certification of the previously non-certified token to the requesting system;

repeating steps (a) through (d) for a plurality of physical objects resulting in a plurality of certified physical objects;

generating or receiving process result data representing a result of an interaction of the plurality of certified physical objects;

generating a non-certified utility token being assigned to and including the process result data;

communicating non-certified utility token validation request data via the token framework to one or more certification systems, the non-certified utility token validation request data representing information indicating the creation of the non-certified utility token in relation to the process result data and a request to have the non-certified token validated;

receiving token certification data representing a certification of the previously non-certified utility token by at least one of the certification systems;

storing the certification data into:
the non-certified utility token to convert the non-certified utility token into a certified utility token being certified by and with respect to each of the certifications represented by the token certification data, or a different utility token being derived from the non-certified utility token and thereby certifying the different utility token with respect to each of the certifications represented by the token certification data; and storing the certified utility token and/or metadata related to the certified process in a protected data repository.

13. The method of claim 12, further comprising:
generating or receiving process participant certification data representing a respective certification of one or more process participants, each process participant being a device, person or institution involved in the performance of a standardized process; and including the process certification data in the non-certified utility token validation request data before communicating it to one or more certification systems.

14. The method of claim 12, further comprising:
communicating information request data via the token framework to the one or more certification systems, the information request data representing an identity of a requestor and a certified request of the requestor to receive specified requested data; and receiving, in return, the requested data via the token framework if the request is certified by the respective certification system.

15. The method of claim 14, further comprising:
storing the received requested data, at least in parts, into one or more distributed ledgers.

16. The method of claim 14, further comprising:
identifying, by means of the token framework, one or more data sources from which the requested data may be retained and communicating the information request data selectively to these one or more data sources.

17. The method of claim 12, further comprising:
receiving information request data via the token framework, the information request data representing an identity of a requestor and a certified request of the requestor to receive specified requested data; and communicating, in return, the requested data via the token framework.

18. The method of claim 12, wherein at least one of the object identification data, inspection certification data, the non-certified utility token validation request data, the utility token certification data, information request data, and the requested data is communicated, received or stored, respectively, in the form of data being embodied in a token.

19. A system including one or more processors configured to perform the method of claim 17.

20. A non-transitory computer-readable medium having stored thereon computer-executable instructions for carrying out the method of claim 12.

* * * * *